(12) United States Patent
Han

(10) Patent No.: US 8,406,008 B2
(45) Date of Patent: Mar. 26, 2013

(54) PORTABLE ELECTRONIC DEVICE WITH GROUNDING MECHANISM

(75) Inventor: De-Zhi Han, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 347 days.

(21) Appl. No.: 12/815,498

(22) Filed: Jun. 15, 2010

(65) Prior Publication Data

US 2011/0095025 A1 Apr. 28, 2011

(30) Foreign Application Priority Data

Oct. 27, 2009 (CN) ...................... 2009 2 0313415 U

(51) Int. Cl.
*H05K 7/18* (2006.01)

(52) U.S. Cl. .................... 361/799; 361/760; 361/728

(58) Field of Classification Search ................... 361/799
See application file for complete search history.

(56) References Cited

U.S. PATENT DOCUMENTS

| | | | |
|---|---|---|---|
| 6,377,448 B1* | 4/2002 | Liu et al. | 361/679.33 |
| 6,830,383 B2* | 12/2004 | Huang | 385/92 |
| 2007/0052100 A1* | 3/2007 | Bellinger | 257/758 |
| 2009/0130917 A1* | 5/2009 | Lloyd | 439/701 |
| 2009/0154117 A1* | 6/2009 | Hsieh et al. | 361/753 |

* cited by examiner

*Primary Examiner* — Tuan T Dinh
*Assistant Examiner* — Steven Sawyer
(74) *Attorney, Agent, or Firm* — Altis Law Group, Inc.

(57) ABSTRACT

A portable electronic device includes a main housing, a metal frame, and at least one metal elastic member. The main housing includes a peripheral wall. The peripheral wall defines a recessed portion and includes at least one latching portion at the recessed portion. The metal frame clips the peripheral wall in the recessed portion. The at least one elastic member is detachably attached to the at least one latching portion. The at least one elastic member electronically connects the metal frame to the housing.

13 Claims, 5 Drawing Sheets

PORTABLE ELECTRONIC DEVICE WITH GROUNDING MECHANISM

BACKGROUND

1. Technical Field

The present disclosure relates to electronic device and, particularly, to an electronic device with a grounding mechanism that is relatively easy to install.

2. Description of Related Art

Portable electronic devices include electronic components to realize different functions. To prevent electrostatic charges from damaging the components, a grounding mechanism is usually disposed inside the portable electronic device to prevent electromagnetic interference and the accumulation of electrostatic charge.

Nowadays, portable electronic devices with metal shells are popular. To remove electrostatic charges on the metal, the grounding mechanism of the portable electronic device includes metal plates connected to the shell. However, lasers are used to attach the metal plates, which is a costly process and can easily damage any elastic members in the device.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the electronic device, in which.

DETAILED DESCRIPTION

Figure 1:
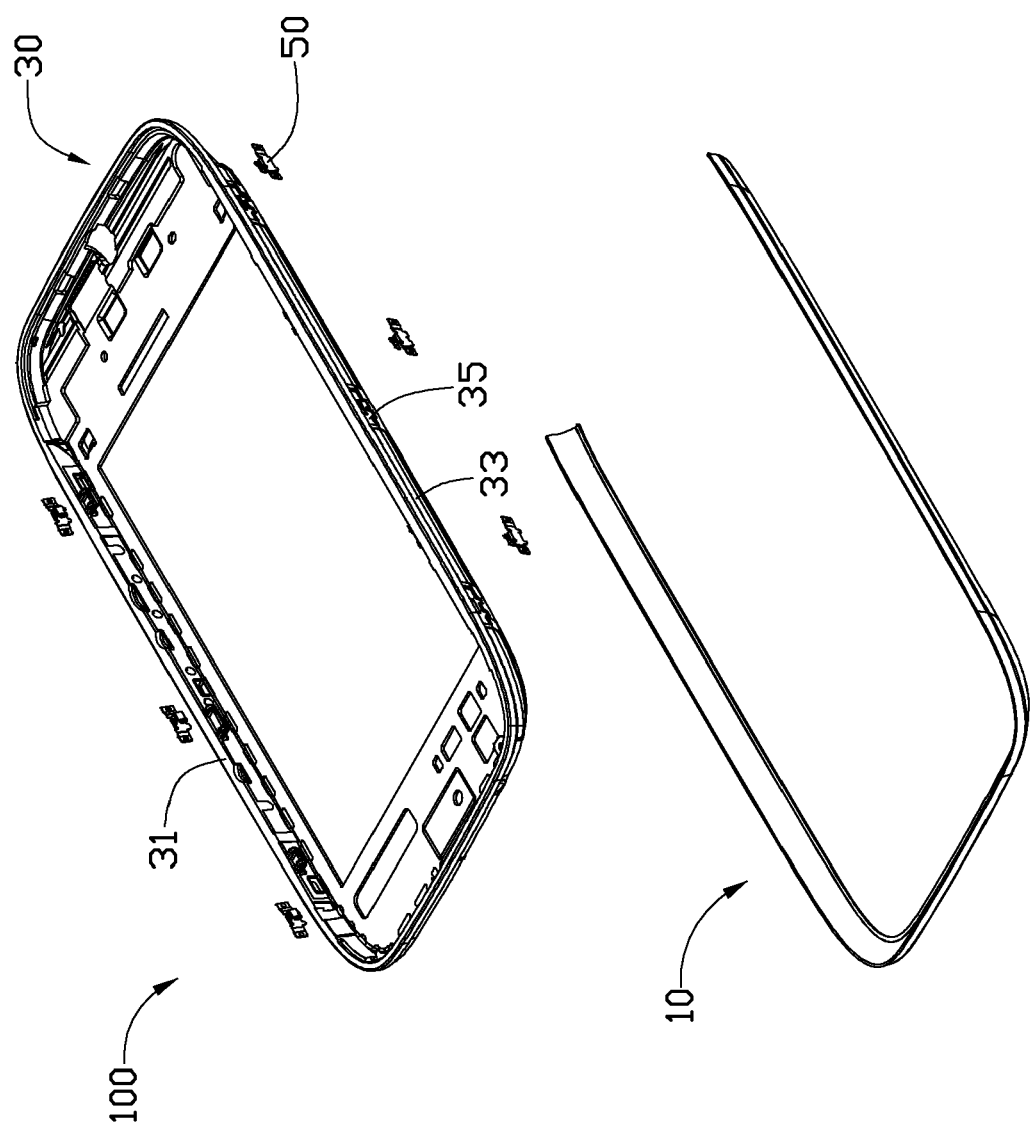
FIG. 1 is an exploded, isometric view of a portable electronic device with a plurality of elastic members, in accordance with an exemplary embodiment.

FIG. 1 shows an exemplary embodiment of a portable electronic device 100. The device 100 includes a main housing 30, and a grounding mechanism (not labeled). The grounding mechanism includes a metal frame 10, and a plurality of metal elastic members 50. The metal frame 10 is attached to the main housing 30, and the elastic members 50 connect the metal frame 10 to the housing 30.

Figure 2:
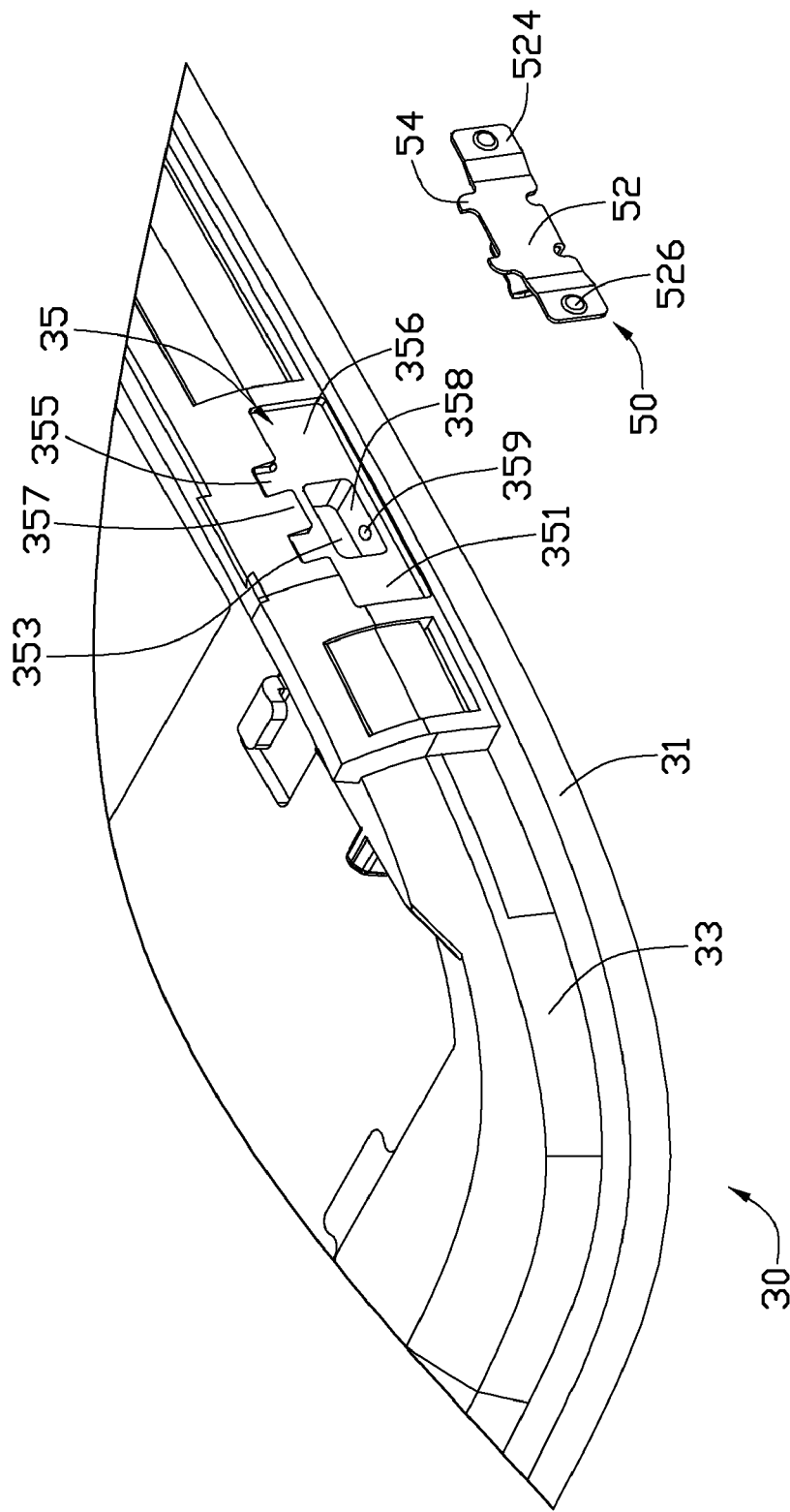
FIG. 2 is a partially, enlarged view of the portable electronic device shown in FIG. 1.

Also referring to FIG. 2, the main housing 30 includes a peripheral wall 31, and the peripheral wall 31 is recessed to form a recessed portion 33 for receiving the metal frame 10. In this exemplary embodiment, the metal frame 10 is U-shaped, and the shape of the recessed portion 33 corresponds to the metal frame 10. The main housing 30 includes a plurality of latching portions 35 in the sidewall 31 for locking the elastic members 50.

Each latching portion 35 defines a receiving groove 351 and two spaced-apart notches 355 communicating with the receiving groove 351. A block 357 is positioned between the two notches 355. Each latching portion 35 further includes a bottom surface 356 in the receiving groove 351, and a through hole 353 defined in the bottom surface 356. The through hole 353 is surrounded by sidewalls 358. One of the sidewalls 358 defines a hemisphere-shaped positioning depression 359.

Figure 3:
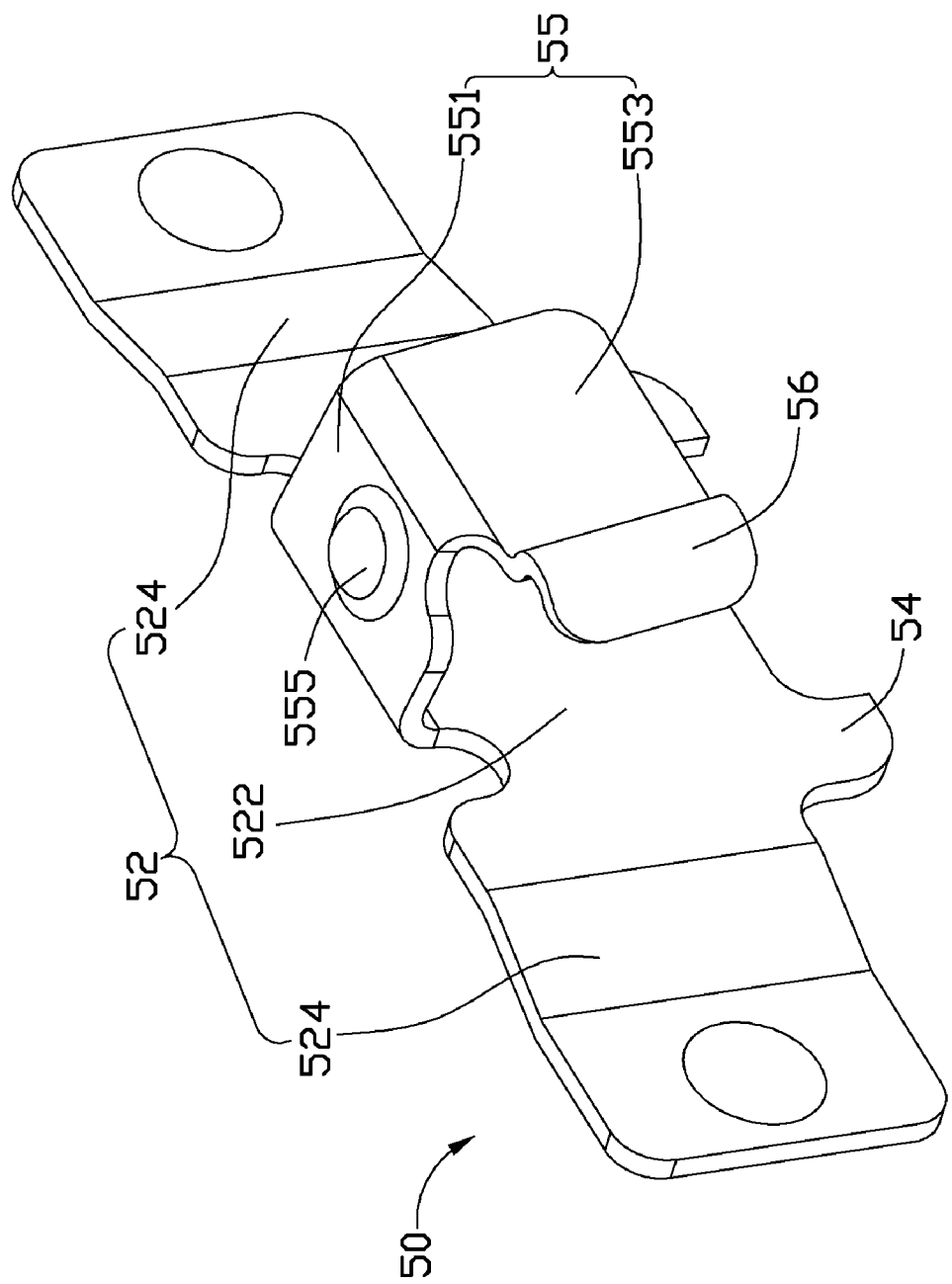
FIG. 3 is an enlarged view of one of the elastic members of the portable electronic device shown in FIG. 1.

Referring to FIG. 3, each elastic member 50 includes a main plate 52, and a locking plate 55. The main plate 52 includes a middle portion 522 and two end portions 524 formed at opposite sides of the middle portion 522. A protrusion 526 is formed on each end portion 524, and the two end portions 524 are slightly bent outward for more effectively electronically connecting with the metal frame 10. Two extending portions 54 extend from one side of the middle portion 522 of the main plate 52 for engaging in the corresponding notches 355 of the main housing 30. The locking plate 55 includes a connecting portion 551 and a bent portion 553 connected to each other. The connecting portion 551 vertically extends from another side of the middle portion 522 of the main plate 52, and the bent portion 553 is bent to be parallel to the middle portion 522 of the main plate 52. A hemispherical projection 555 is formed on the connecting portion 551 for engaging in the corresponding depression 359 of the main housing 30. A touching portion 56 extends from the bent plate 553, and is bent to protrude outward at a middle portion for easily touching another element (not shown) of the grounding mechanism inside the main housing 30.

Figure 4:
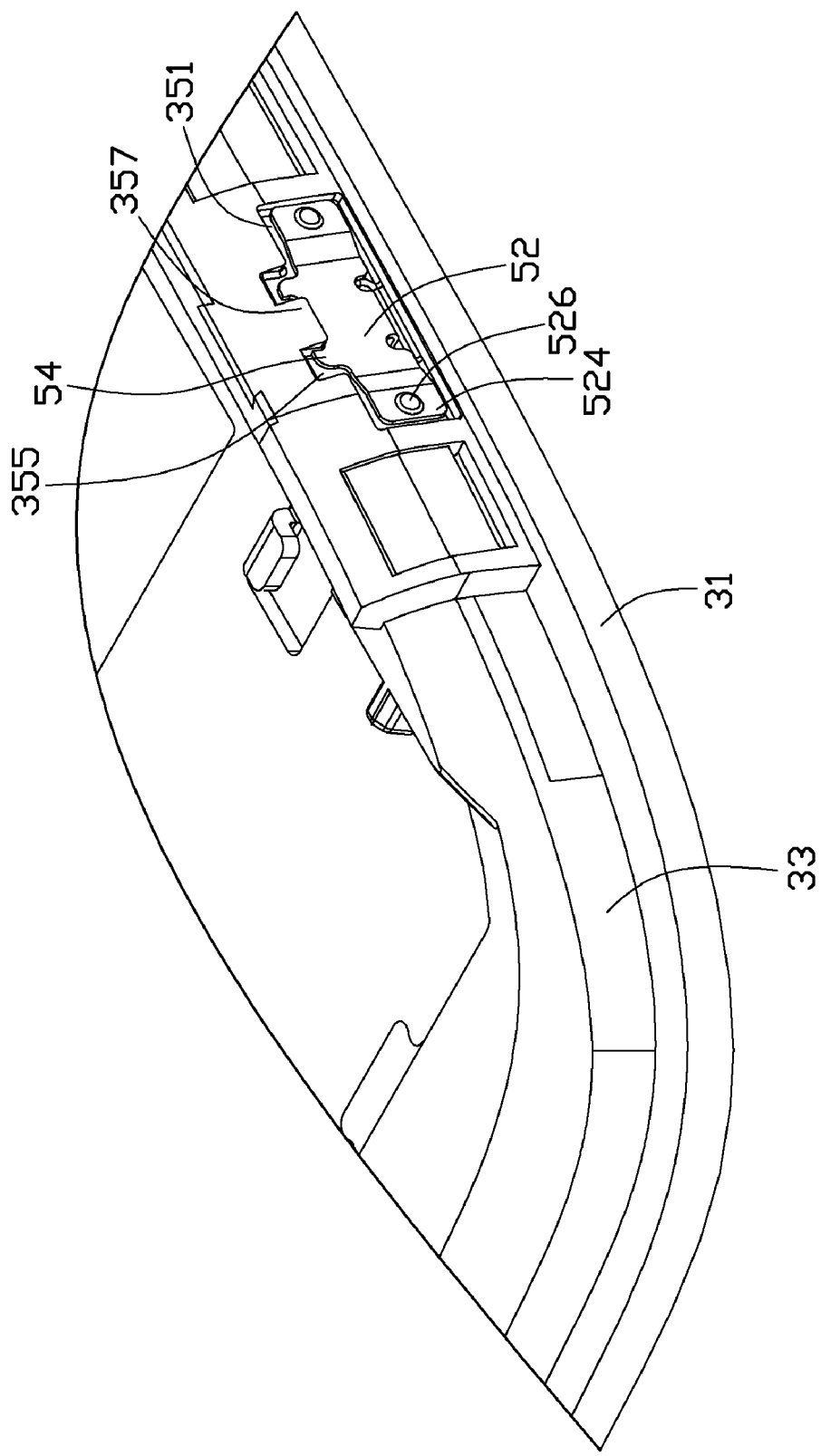
FIG. 4 is similar to FIG. 2, but showing the elastic member attached to the portable electronic device.
Figure 5:
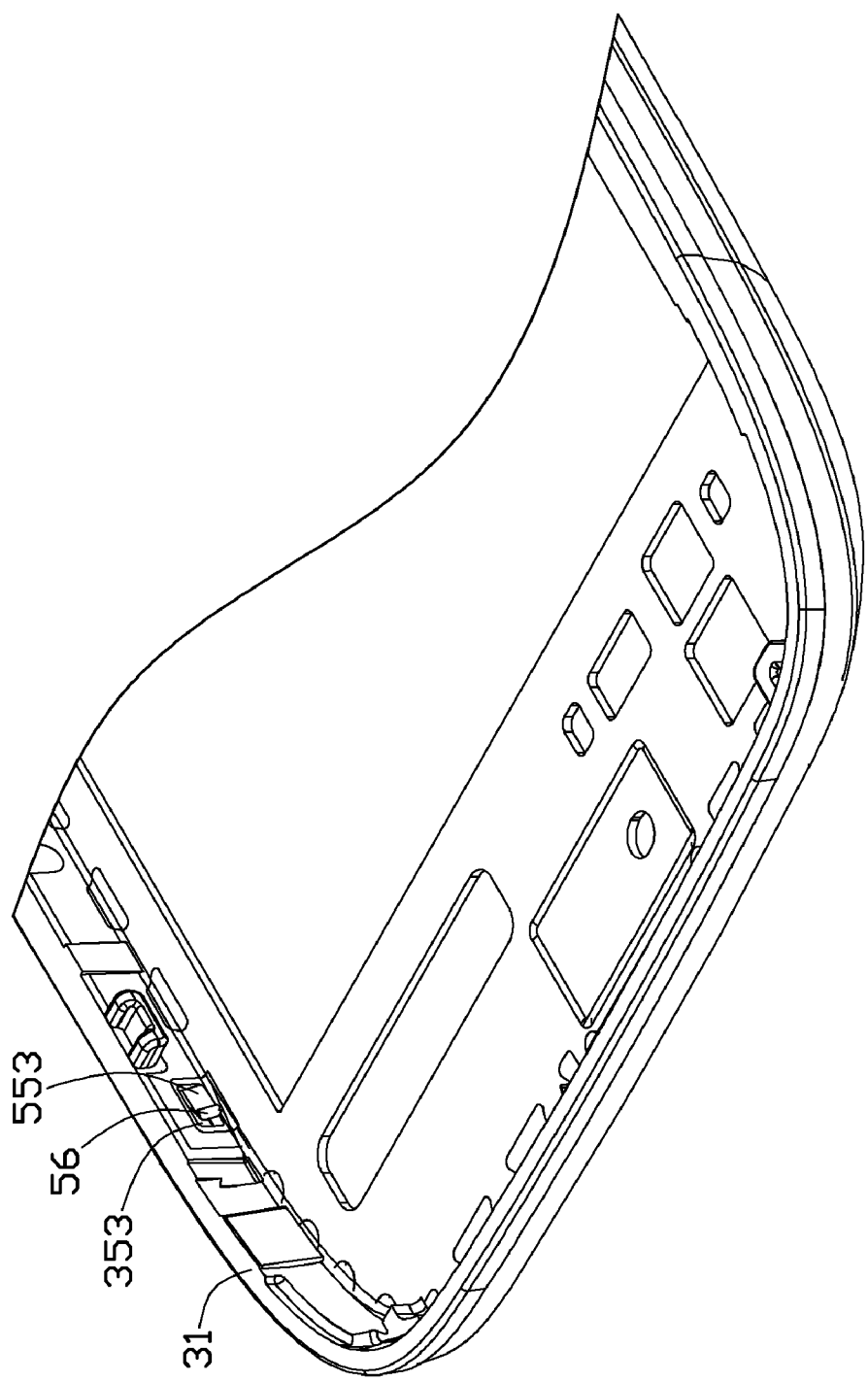
FIG. 5 is similar to FIG. 4, but shown from another aspect.

Referring to FIGS. 4 and 5, to attach the elastic members 50 to the latching portions 35 of the main housing 30 correspondingly, the locking plate 55 and the touching portion 56 of each elastic member 50 are inserted into the through hole 353 of the corresponding latching portion 35. The touching portion 56 extends out from the through hole 353 and electronically connects to the other element of the grounding mechanism inside the housing 30. The main plate 52 and the extending portions 54 are respectively received in the receiving groove 351 and the notches 355. The hemispherical projection 555 on the connecting plate is locked in the positioning depression 359 in the sidewall 358 to stop the elastic member 50 from moving.

When the metal frame 10 is attached to the recessed portion 33 of the main housing 30, the metal frame 10 clips to the peripheral wall 31 by its elasticity. The protrusions 526 electronically connect the metal frame 10 with another element of the grounding mechanism inside the main housing 30 to remove electrostatic charges on the metal frame 10.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A portable electronic device comprising:
    a main housing including a recessed portion and at least one latching portion formed in the recessed portion;
    a metal frame engaging with the recessed portion; and
    at least one metal elastic member detachably attached to the at least one latching portion, the at least one elastic member electronically connecting with the metal frame;
    wherein the at least one elastic member includes a main plate, a touching portion, and a locking plate, and the locking plate connects the main plate and the touching portion;
    wherein the main plate includes a middle portion and two end portions, and the two end portions are bent to protrude outward; and
    wherein the locking plate includes a connecting portion and a bent portion, the connecting portion vertically extends from the middle portion, and the bent portion is parallel to the middle portion.

2. The portable electronic device as claimed in claim 1, wherein the at least one latching portion defines a receiving groove and a through hole communicating to the receiving groove, the main plate is engaged in the receiving groove, and the touching portion extends out from the through hole.

3. The portable electronic device as claimed in claim 2, wherein the at least one latching portion defines two spaced-apart notches communicating to the receiving groove, and the at least one elastic member includes two extending portions, each extending portion received in one of the notches.

4. The portable electronic device as claimed in claim 3, wherein the locking plate is received in the through hole.

5. The portable electronic device as claimed in claim 4, wherein the at least one latching portion defines a depression communicating to the through hole, a projection is formed on the connecting portion of the locking plate, and the projection is locked in the depression.

6. The portable electronic device as claimed in claim 4, wherein the at least one elastic member includes a touching protrusion on each of the end portions, and the touching portions electronically connect with the metal frame.

7. The portable electronic device as claimed in claim 4, wherein the touching portion is bent to protrude outward at a middle portion thereof.

8. A portable electronic device comprising:
a main housing including a peripheral wall, the peripheral wall defining a recessed portion and including a plurality of latching portions in the recessed portion, each of the latching portions defining a through hole;
a metal frame clipping the peripheral wall in the recessed portion; and
a plurality of metal elastic members detachably attached to the latching portions correspondingly and electronically connecting with the metal frame, each elastic member including a locking plate and a touching portion connected to each other, the locking plate being locked in the through hole of the latching portion, the touching portion extending out from the through hole;
wherein each elastic member further includes a main plate, and the locking plate connected to the main plate;
wherein the main plate includes a middle portion and two end portions, and the two end portions are bent to protrude outward; and
wherein the locking plate includes a connecting portion and a bent portion, the connecting portion vertically extends from the middle portion, and the bent portion is parallel to the middle portion.

9. The portable electronic device as claimed in claim 8, wherein each latching portion defines a receiving groove communicating with the through hole, and the main plate corresponding to the latching portion is engaged in the receiving groove.

10. The portable electronic device as claimed in claim 9, wherein the latching portion defines two spaced notches communicating to the receiving groove, and the elastic member includes two extending portions, each extending portion received in one of the notches.

11. The portable electronic device as claimed in claim 10, wherein the latching portion defines a depression communicating to the through hole, a projection is formed on the connecting portion of the locking plate, and the projection is locked in the depression.

12. The portable electronic device as claimed in claim 11, wherein the elastic member includes a touching protrusion on each of the end portions, and the touching portions electronically connect the metal frame.

13. The portable electronic device as claimed in claim 12, wherein the touching portion is bent to protrude outward at a middle portion thereof.

* * * * *